US012623618B2

(12) United States Patent
Ota et al.

(10) Patent No.: US 12,623,618 B2
(45) Date of Patent: May 12, 2026

(54) VEHICLE CONTROL SYSTEM, INFORMATION PROCESSING DEVICE, AND MASTER ELECTRONIC CONTROL UNIT

(71) Applicant: TOYOTA JIDOSHA KABUSHIKI KAISHA, Toyota (JP)

(72) Inventors: Hiroshi Ota, Nagoya (JP); Yasuhiro Yamasaki, Nisshin (JP); Kenichiro Hayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 18/758,595

(22) Filed: Jun. 28, 2024

(65) Prior Publication Data

US 2025/0050829 A1 Feb. 13, 2025

(30) Foreign Application Priority Data

Aug. 8, 2023 (JP) .................................. 2023-129281

(51) Int. Cl.
*B60R 16/023* (2006.01)

(52) U.S. Cl.
CPC ................................ *B60R 16/0232* (2013.01)

(58) Field of Classification Search
CPC .................................................. B60R 16/0232
See application file for complete search history.

(56) References Cited

U.S. PATENT DOCUMENTS

| | | | |
|---|---|---|---|
| 2004/0090962 A1* | 5/2004 | Forest ..................... | H04L 12/44 |
| | | | 370/442 |
| 2012/0022748 A1* | 1/2012 | Swanson ................. | G09F 21/04 |
| | | | 701/36 |
| 2020/0169972 A1* | 5/2020 | Marce ................... | H04L 47/283 |
| 2021/0350729 A1* | 11/2021 | Swanson ................. | B60Q 1/26 |

FOREIGN PATENT DOCUMENTS

JP 2013-243651 A 12/2013

OTHER PUBLICATIONS

Ji, K. Real-time Control Over Networks, Google Scholar, Dissertation Texas A&M University, May 2006, pp. 1-236. (Year: 2006).*
Vasistha, D.K. Detecting Anomalies in Controller Area Network for Automobiles, Google Scholar, Thesis Texas A&M University, Aug. 2017, pp. 1-51. (Year: 2017).*

* cited by examiner

*Primary Examiner* — Russell Frejd
(74) *Attorney, Agent, or Firm* — OLIFF PLC.

(57) ABSTRACT

A vehicle control system includes a master controller and multiple slave controllers configured to communicate with the master controller via an in-vehicle network. The vehicle control system is configured to acquire accuracy-related information, which is information related to accuracy of time synchronization between the master controller and the slave controllers, from the master controller and the multiple slave controllers, and transmit list information based on the accuracy-related information acquired from the master controller and the multiple slave controllers to the master controller and the multiple slave controllers.

8 Claims, 4 Drawing Sheets

VEHICLE CONTROL SYSTEM, INFORMATION PROCESSING DEVICE, AND MASTER ELECTRONIC CONTROL UNIT

CROSS-REFERENCE TO RELATED APPLICATIONS

This application is based upon and claims the benefit of priority from prior Japanese Patent Application No. 2023-129281, filed on Aug. 8, 2023, the entire contents of which are incorporated herein by reference.

BACKGROUND

1. Field

The present disclosure relates to a vehicle control system, an information processing device, and a master electronic control unit.

2. Description of Related Art

Japanese Laid-Open Patent Publication No. 2013-243651 discloses a time synchronization system including an upstream packet transmission device and multiple downstream packet transmission devices. In the system, the multiple downstream packet transmission devices perform time synchronization with the upstream packet transmission device.

In recent years, a vehicle control system including multiple electronic control units communicably connected to each other via an in-vehicle network has been developed. In this system, one of the multiple electronic control units functions as a master electronic control unit, and the remaining electronic control units function as slave electronic control units. Advanced vehicle control can be realized by cooperation of the multiple electronic control units.

In order to realize advanced vehicle control, it is necessary to perform time synchronization between the master electronic control unit and the slave electronic control units. However, an anomaly may occur in time synchronization between any one of the multiple slave electronic control units and the master electronic control unit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present disclosure provides a vehicle control system. The vehicle control system includes a master controller and multiple slave controllers configured to communicate with the master controller via an in-vehicle network. The vehicle control system is configured to perform acquiring accuracy-related information, which is information related to accuracy of time synchronization between the master controller and the slave controllers, from the master controller and the multiple slave controllers, and transmitting list information based on the accuracy-related information acquired from the master controller and the multiple slave controllers to the master controller and the multiple slave controllers.

A second aspect of the present disclosure provides an information processing device. The information processing device is configured to be communicably connected to the master electronic control unit and the multiple slave electronic control units via an in-vehicle network. The information processing device is configured to perform receiving accuracy-related information from the master electronic control unit and the multiple slave electronic control units, the accuracy-related information being information related to accuracy of time synchronization between the master electronic control unit and the slave electronic control units, and transmitting list information based on the accuracy-related information acquired from the master electronic control unit and the multiple slave electronic control units to the master electronic control unit and the multiple slave electronic control units.

A third aspect of the present disclosure provides a master electronic control unit. The master electronic control unit is configured to be communicably connected to the multiple slave electronic control units via an in-vehicle network. The master electronic control unit is configured to perform receiving accuracy-related information, which is information related to accuracy of time synchronization between the master electronic control unit and the slave electronic control units, from the multiple slave electronic control units, and to transmitting list information based on the accuracy-related information acquired from the multiple slave electronic control units to the multiple slave electronic control units.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a vehicle control system and an information processing device will be described with reference to FIGS. 1 to 4.

Vehicle Control System

Figure 1:
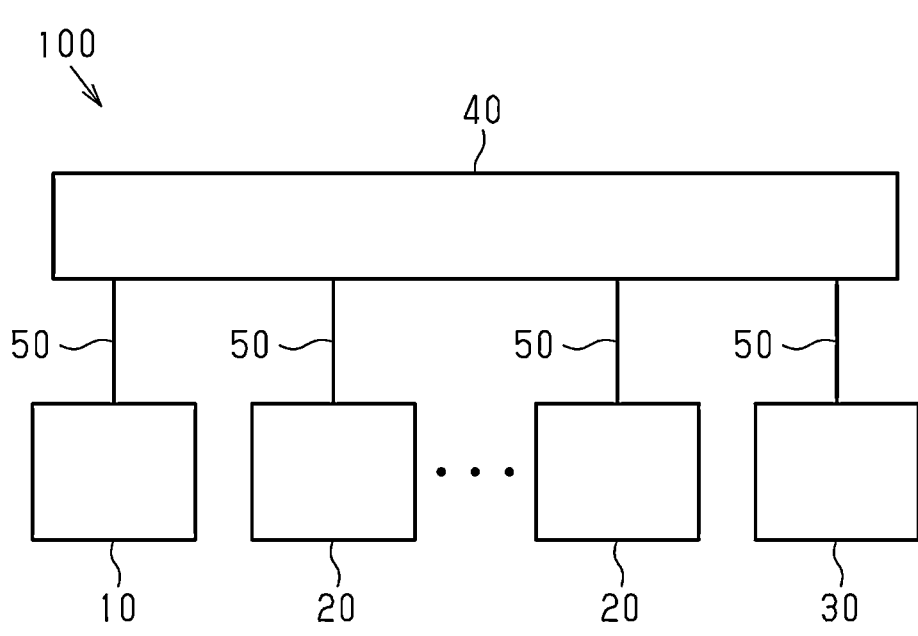
FIG. 1 is a block diagram showing a vehicle control system according to an embodiment.

As shown in FIG. 1, the vehicle control system 100 includes multiple electronic control units configured to communicate with each other via an in-vehicle network. An example of the in-vehicle network is Ethernet (registered trademark).

The multiple electronic control units include a master electronic control unit 10, multiple slave electronic control units 20, and a validator electronic control unit 30. Each of the multiple electronic control units includes a processor and a memory. The memory includes a memory that stores a control program executed by the processor and a memory that temporarily stores data.

In the present embodiment, the master electronic control unit 10 corresponds to a master controller. The slave electronic control unit 20 corresponds to a slave controller. The validator electronic control unit 30 corresponds to an information processing device.

Hereinafter, the electronic control unit is referred to as an ECU. Therefore, the master electronic control unit 10 is referred to as a master ECU 10. The slave electronic control unit 20 is referred to as a slave ECU 20. Validator electronic control unit 30 is referred to as a validator ECU 30.

The vehicle control system 100 realizes advanced vehicle control by causing the multiple ECUs connected via the in-vehicle network to cooperate with each other. Therefore, the vehicle control system 100 needs to monitor whether an anomaly occurs in the time synchronization between the ECUs. The processing for determining whether or not the anomaly of the time synchronization occurs is repeatedly executed in parallel with the processing of the vehicle control.

The in-vehicle network is constituted by the switch ECU 40 and the bus 50. The master ECU 10, the multiple slave ECUs 20, and the validator ECU 30 are each connected to the switch ECU 40 via a bus 50.

The master ECU 10 outputs first time information serving as a reference. The multiple slave ECUs 20 are respectively connected to the switch ECU 40 via the bus 50. Each of the multiple slave ECUs 20 acquires the first time information through exchange of signals with the master ECU 10, and calculates a delay time pDelay of transmission in the in-vehicle network. Then, the multiple slave ECUs 20 output the second time information subjected to the time synchronization using the delay time pDelay. The calculation of the delay time pDelay will be described later.

The multiple slave ECUs 20 are ECUs that realize various functions in the vehicle. Examples of such an ECU include an engine ECU, a motor generator ECU, a brake ECU, and a driving assistance ECU. The engine ECU controls the engine. The motor generator ECU controls the motor generator. The brake ECU controls the brake device. The driving assistance ECU is an ECU that realizes advanced driving assistance.

Collection of Information for Diagnosing Synchronization Anomaly

Figure 2:
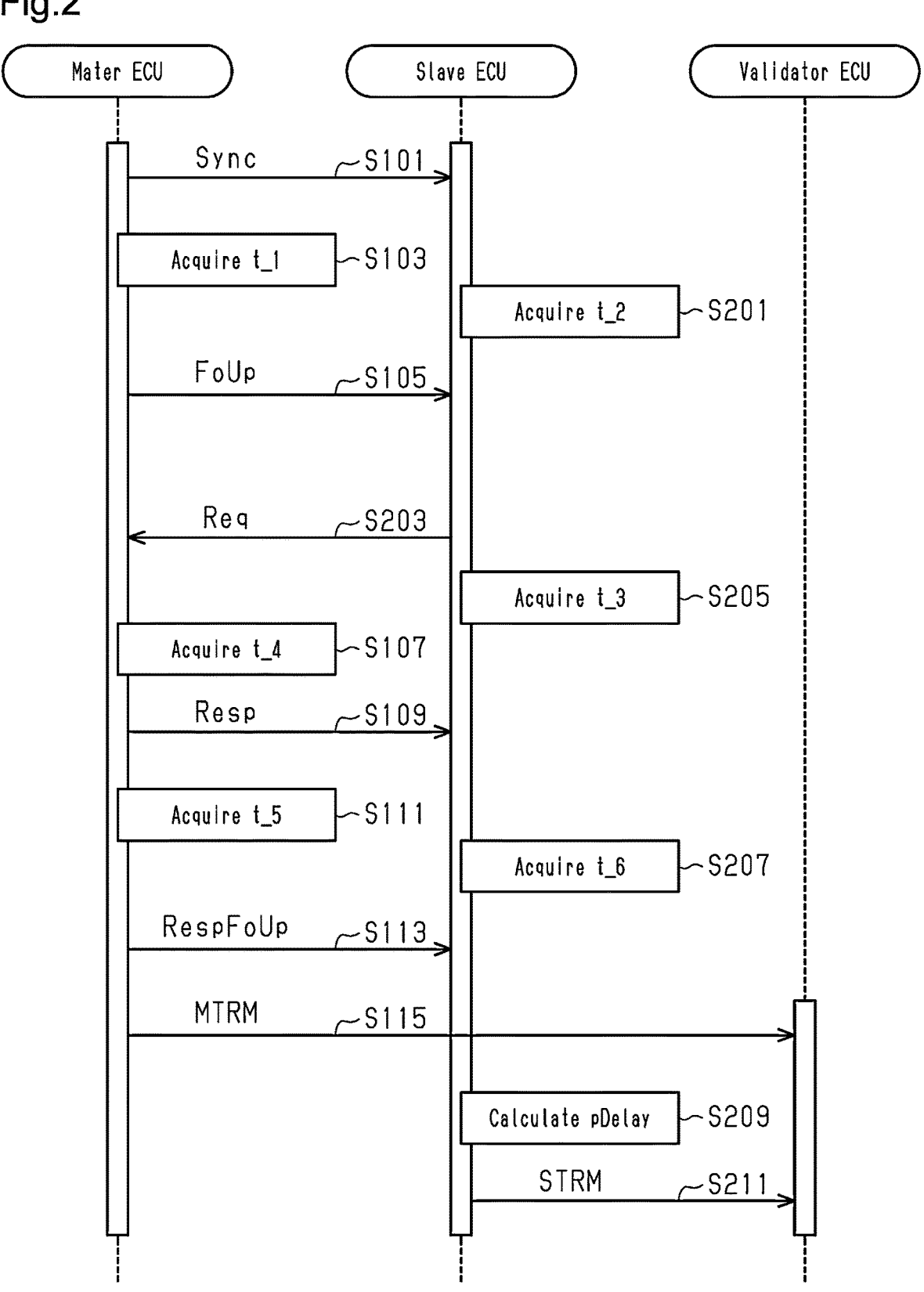
FIG. 2 is a sequence diagram showing a flow of processing for the validator electronic control unit to collect the accuracy-related information from the master electronic control unit and the slave electronic control unit.

In the vehicle control system 100, signals are periodically exchanged between the master ECU 10 and the slave ECU 20, and each of the master SL and the slave SL acquires time information when the signal is transmitted and time information when the signal is received. Then, the validator ECU 30 periodically determines whether or not the synchronization anomaly between the first time information and the second time information has occurred. FIG. 2 is a sequence diagram illustrating a flow of a process in which the validator ECU 30 collects information necessary for determining whether or not an anomaly has occurred in time synchronization between the master ECU 10 and the slave ECU 20, from the master ECU 10 and the slave ECU 20. The vehicle control system 100 periodically executes this sequence in parallel with processing related to the control of the vehicle during operation. This sequence is executed by the validator ECU 30, the master ECU 10, and each of the multiple slave ECUs 20. In FIG. 2, only one of the multiple slave ECUs 20 is shown.

In a first step S101, the master ECU 10 transmits a first signal Sync to the slave ECU 20. In the next step S103, the master ECU 10 acquires the first time information when the first signal Sync is transmitted as the first time t_1. The first time information is time information measured by the master ECU 10.

Upon receiving the first signal Sync, the slave ECU 20 shifts the processing to step S201. In step S201, the slave ECU 20 acquires the second time information at the time of receiving the first signal Sync as the second time t_2. The second time information is time information measured by the slave ECU 20.

When the master ECU 10 transmits the first signal Sync to the slave ECU 20, the master S105 shifts the processing to step SL. In step S105, the master ECU 10 transmits the fourth signal FoUp to the slave ECU 20. For example, the master ECU 10 transmits the time stamp of the first time t_1 as the fourth signal FoUp.

The slave ECU 20 acquires the first time t_1 by receiving the first signal Sync. Upon acquiring the first time t_1, the slave ECU 20 shifts the processing to step S203. In a step S203, the slave ECU 20 transmits a second signal Req to the master ECU 10. In the subsequent step S205, the slave ECU 20 acquires the second time information at the time of transmitting the second signal Req as the third time t_3.

Upon receiving the second signal Req, the master ECU 10 shifts the processing to step S107. In step S107, the master ECU 10 acquires the first time information at the time of receiving the second signal Req as the fourth time t_4. In a next step S109, the master ECU 10 transmits a third signal Resp to the slave ECU 20. In the subsequent step S111, the master ECU 10 acquires the first time information when the third signal Resp is transmitted as the fifth time t_5.

Upon receiving the third signal Resp, the slave ECU 20 shifts the processing to step S207. In the step S207, the slave ECU 20 acquires the second time information at the time of receiving the third signal Resp as the sixth time t_6.

Upon acquiring the fifth time t_5, the master ECU 10 shifts the processing to step S113. In step S113, the master ECU 10 transmits a fifth signal RespFoUp to the slave ECU 20. For example, the master ECU 10 transmits the time stamp of the fourth time t_4 and the time stamp of the fifth time t_5 as the fifth signal RespFoUp. The slave ECU 20 acquires the fourth time t_4 and the fifth time t_5 by receiving the fifth signal RespFoUp. Upon acquiring the fourth time t_4 and the fifth time t_5, the slave ECU 20 shifts the processing to step S209. In step S209, the slave ECU 20 calculates the delay time pDelay. The delay time pDelay is a time of a transmission delay of a signal between the master ECU 10 and the slave ECU 20. The slave ECU 20 calculates the delay time pDelay based on the third time t_3, the fourth time t_4, the fifth time t_5, and the sixth time t_6. For example, the slave ECU 20 calculates a first difference that is a difference obtained by subtracting the third time t_3 from the sixth time t_6. The slave ECU 20 calculates a second difference that is a difference obtained by subtracting the fourth time t_4 from the fifth time t_5. Then, the slave ECU 20 calculates the delay time pDelay by dividing the difference obtained by subtracting the second difference from the first difference by two.

On the other hand, when transmitting the fifth signal RespFoUp, the master ECU 10 shifts the processing to step S115. In step S115, the master ECU 10 sends a master timing record message MTRM to the validator ECU 30. The master timing record message MTRM includes the sequence ID of the transmitted first signal Sync, the time stamp of the first time t_1, the time stamp of the fourth time t_4, and the time stamp of the fifth time t_5. In the present embodiment, the master timing record message MTRM corresponds to accuracy-related information, which is information related to the accuracy of time synchronization between the master ECU 10 and the slave ECU 20.

After calculating the delay time pDelay, the slave ECU 20 shifts the processing to step S211. In step S211, the slave ECU 20 sends a slave timing record message STRM to the validator ECU 30. The slave timing record message STRM includes the identification of the slave ECU 20, the sequence identification of the received first signal Sync, the sequence identification of the received fourth signal FoUp, and the sequence identification of the received fifth signal RespFoUp. Further, the slave timing record message STRM includes a time stamp of the second time t_2, a time stamp of the third time t_3, and a time stamp of the sixth time t_6. Further, the slave timing record message STRM includes the value of the delay time pDelay. In the present embodiment, the slave timing record message STRM corresponds to accuracy-related information.

That is, the validator ECU 30 acquires the master timing record message MTRM and the slave timing record message STRM as the accuracy-related information from the master ECU 10 and the slave ECU 20 through the execution of the sequence illustrated in FIG. 2.

As described above, the vehicle control system 100 includes multiple slave ECUs 20. Therefore, the validator ECU 30 acquires the accuracy-related information related to the accuracy of the time synchronization between the first slave ECU among the multiple slave ECUs 20 and the master ECU 10, from the first slave ECU and the master ECU 10. The validator ECU 30 is configured to acquire the accuracy-related information. Further, the validator ECU 30 acquires, from the second slave ECU and the master ECU 10, the accuracy-related information related to the accuracy of the time synchronization between the second slave ECU among the multiple slave ECUs 20 and the master ECU 10. In addition, the validator ECU 30 acquires the accuracy-related information regarding the accuracy of the time synchronization between the third slave ECU among the multiple slave ECUs 20 and the master ECU 10, from the third slave ECU and the master ECU 10.

Diagnosis of Synchronization Anomaly

Figure 3:
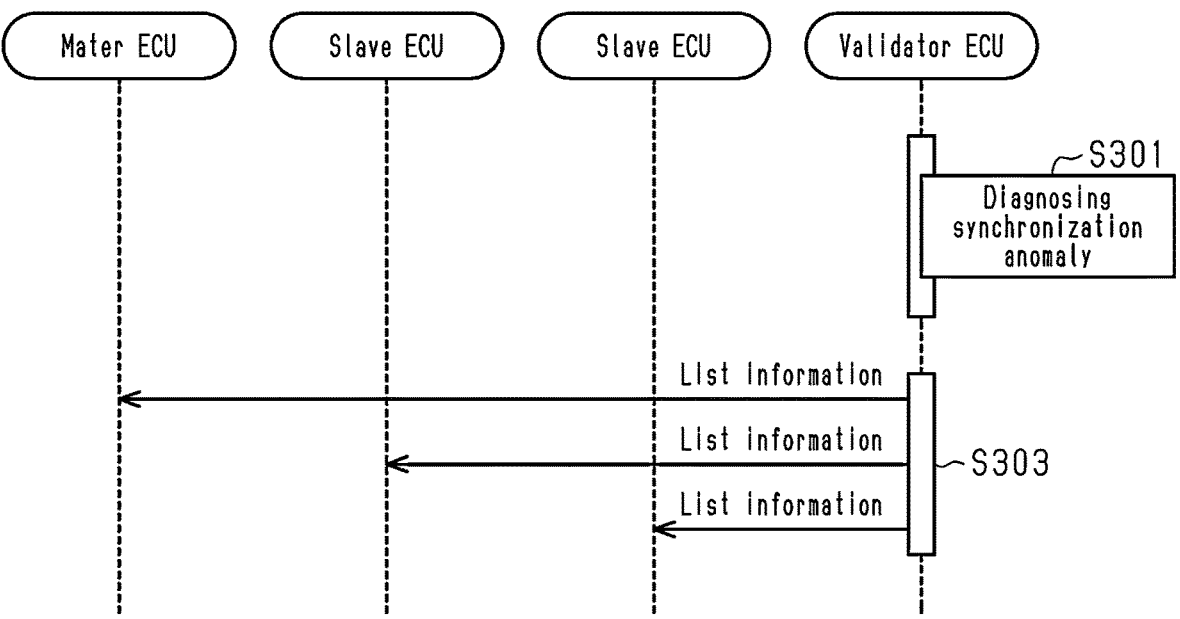
FIG. 3 is a sequence diagram showing the flow of processing when the validator electronic control unit determines whether or not an anomaly has occurred in the time synchronization and transmits the determination result to the master electronic control unit and the multiple slave electronic control units.

FIG. 3 is a sequence diagram showing a processing flow when the validator ECU 30 diagnoses the synchronization anomaly and transmits the diagnostic result to the master ECU 10 and the multiple slave ECUs 20. Note that FIG. 3 illustrates only two of the multiple slave ECUs 20.

Figure 4:
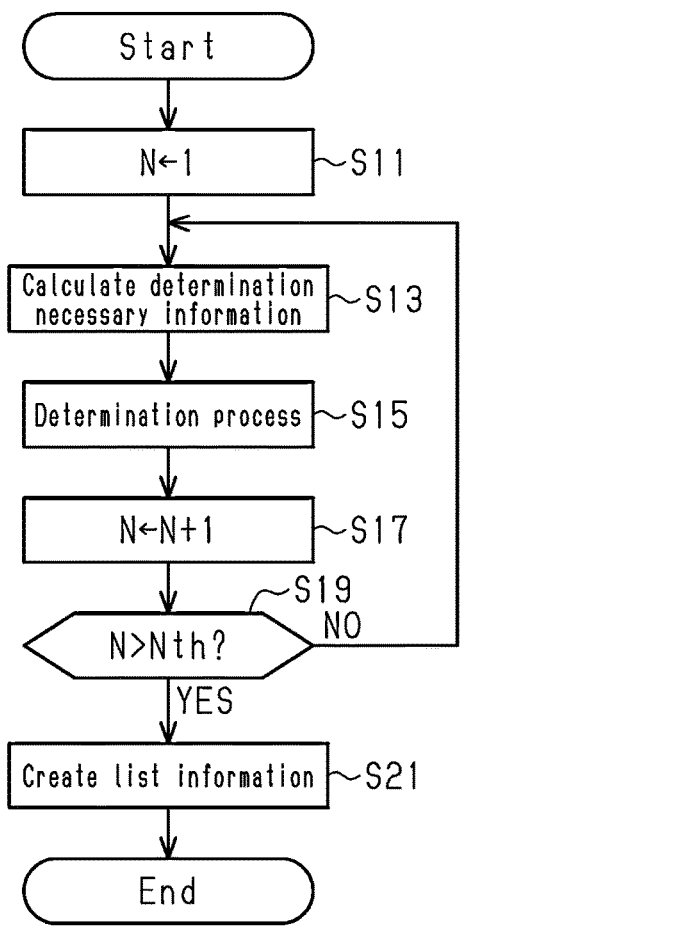
FIG. 4 is a flowchart illustrating a processing routine executed by the validator electronic control unit to determine whether or not an anomaly has occurred in the time synchronization.

In step S301, the validator ECU 30 diagnoses a synchronization anomaly. FIG. 4 is a flowchart showing a processing routine for diagnosing a synchronization anomaly. In a first step S11, the validator ECU 30 sets a coefficient N to 1. In the subsequent step S13, the validator ECU 30 calculates the determination necessary information. The determination necessary information is information necessary for determining whether or not an anomaly has occurred in time synchronization between the master ECU 10 and the N-th slave ECU. The validator ECU 30 calculates determination necessary information based on the accuracy-related information.

For example, the validator ECU 30 calculates a cycle shift. The cycle deviation is a deviation between the calculation cycle of the master ECU 10 and the calculation cycle of the N-th slave ECU. For example, the validator ECU 30 calculates a third difference obtained by subtracting the first time t_1 acquired in the previously executed sequence from the first time t_1 acquired in the currently executed sequence. The third difference corresponds to the cycle of processing in the master ECU 10. Similarly, the validator ECU 30 calculates a fourth difference obtained by subtracting the second time t_2 acquired in the previously executed sequence from the second time t_2 acquired in the currently executed sequence. The fourth difference corresponds to the processing cycle in the N-th slave ECU. Then, the validator ECU 30 calculates the calculated value by subtracting the fourth difference from the third difference. This calculated value corresponds to the period deviation. Hereinafter, the calculated value is referred to as a period deviation equivalent value".

Subsequently, the validator ECU 30 calculates an offset between the first time information and the second time information. For example, the validator ECU 30 calculates a fifth difference obtained by subtracting the delay time pDelay from the second time t_2. Then, the validator ECU 30 calculates absolute values of differences obtained by subtracting the fifth differences from the first time t_1. This absolute value is the offset. Hereinafter, the absolute value is referred to as an "offset equivalent value".

In the present embodiment, the period shift equivalent value and the offset equivalent value are the determination necessary information. When the validator ECU 30 calculates the cycle shift equivalent value and the offset equivalent value, the validator ECU 30 shifts the processing to step S15. In step S15, the validator ECU 30 executes a determination process of determining whether an anomaly occurs in the time synchronization between the master ECU 10 and the N-th slave ECU based on the accuracy-related information. Here, the validator ECU 30 performs the determination process using the determination-required information calculated in step S13. As described above, the determination necessary information is information calculated based on the accuracy-related information.

An example of the determination process will be described. When at least one of the following two conditions (A1) and (A2) is satisfied, the validator ECU 30 determines that an anomaly has occurred in the time synchronization between the master ECU 10 and the N-th slave ECU. On the other hand, when none of the two conditions (A1) and (A2) is satisfied, the validator ECU 30 determines that no anomaly has occurred in the time synchronization between the master ECU 10 and the N-th slave ECU.

(A1) It can be determined that there is a cycle shift.
(A2) It can be determined that there is an offset deviation.

For example, the validator ECU 30 determines whether or not the cycle shift equivalent value is equal to or larger than the cycle shift determination value. A criterion for determining whether or not there is a period shift is set as a period shift determination value. That is, the validator ECU 30 determines that there is a cycle shift when the cycle shift determination value is equal to or larger than the cycle shift determination value. On the other hand, the validator ECU 30 determines that there is no cycle shift when the cycle shift determination value is less than the cycle shift determination value.

For example, the validator ECU 30 determines whether or not the offset equivalent value is equal to or larger than the offset determination value. A criterion for determining whether or not there is an offset deviation is set as an offset determination value. That is, when the offset equivalent value is equal to or larger than the offset determination value, the validator ECU 30 determines that there is an offset deviation. On the other hand, when the offset equivalent value is less than the offset determination value, the validator ECU 30 determines that there is no offset deviation.

When the validator ECU 30 executes the determination processing, the validator ECU 30 shifts the processing to step S17. In step S17, the validator ECU 30 updates the coefficient N so that the coefficient N is increased by 1. In the subsequent step S19, the validator ECU 30 determines whether or not the coefficient N is larger than the determination coefficient Nth. The number of slaves ECU 20 included in the vehicle control system 100 is set as the determination coefficient Nth. In other words, the validator ECU 30 determines whether or not the determination process has been executed for all the slaves ECU 20. When the coefficient N is equal to or less than the determination coefficient Nth, there is a slave ECU 20 for which the determination process has not been executed among the Nth slave ECU 20. Therefore, when the coefficient N is equal to or less than the determination coefficient Nth (S19: NO), the validator ECU 30 shifts the processing to step S13. On the other hand, when the coefficient N is larger than the determination coefficient Nth, the determination process can be executed on all of the Nth slaves ECU 20. Therefore, when the coefficient N is larger than the determination coefficient Nth (S19: YES), the validator ECU 30 shifts the processing to step S21.

In step S21, the validator ECU 30 creates list information. The list information is information based on the accuracy-related information acquired from the master ECU 10 and the multiple slave ECUs 20. In the present embodiment, the validator ECU 30 creates the determination result by the determination process for the multiple slave ECUs 20 as the list information. Thereafter, the validator ECU 30 ends the processing routine illustrated in FIG. 4.

Returning to FIG. 3, when the validator ECU 30 creates the list information, the validator ECU 30 shifts the processing to step S303. In step S303, the validator ECU 30 transmits the list information to the master ECU 10 and the multiple slave ECUs 20.

Operation and Effects of Present Embodiment (1) The validator ECU 30 acquires the accuracy-related information regarding the accuracy of the time synchronization with the master ECU 10 and the slave ECU 20 from the master ECU 10 and the multiple slave ECUs 20. Then, the validator ECU 30 transmits list information based on the accuracy-related information acquired from the master ECU 10 and the multiple slave ECUs 20 to the master ECU 10 and the multiple slave ECUs 20. Therefore, in the vehicle control system 100, the determination result of whether or not an anomaly has occurred in the time synchronization between the master ECU 10 and the slave ECU 20 can be shared by the master ECU 10 and the multiple slave ECUs 20.

(2) In the vehicle control system 100, the determination process is executed in the validator ECU 30. Then, the validator ECU 30 transmits the determination result by the determination processing for the multiple slave ECUs 20 to the master ECU 10 and the multiple slave ECUs 20 as the list information.

In the validator ECU 30, the calculation of the determination necessary information is performed, but the determination process is not performed. In this case, the validator ECU 30 transmits the determination necessary information as list information to the master ECU 10 and the multiple slave ECUs 20. Then, the determination process is executed based on the received determination-required information in each of the master ECU 10 and the multiple slave ECUs 20. Accordingly, the determination result of whether or not an anomaly has occurred in the time synchronization between the master ECU 10 and the slave ECU 20 can be shared by the master ECU 10 and the multiple slave ECUs 20. However, since the determination process is executed in each of the master ECU 10 and the multiple slave ECUs 20, the control load of the master ECU 10 and the multiple slave ECUs 20 increases.

On the other hand, in the vehicle control system 100, the validator ECU 30 executes the determination process. Then, the validator ECU 30 transmits the determination result by the determination processing for the multiple slave ECUs 20 to the master ECU 10 and the multiple slave ECUs 20 as the list information. Therefore, in the vehicle control system 100, it is possible for the master ECU 10 and the multiple slave ECUs 20 to share the determination result of whether or not an anomaly has occurred in the time synchronization between the ECUs without increasing the control load of the master ECU 10 and the multiple slave ECUs 20.

Modifications

The above-described embodiment may be modified as follows. The above-described embodiment and the following modifications can be implemented in combination with each other as long as there is no technical contradiction.

In the above embodiment, the master ECU 10, the multiple slave ECUs 20, and the validator ECU 30 are connected to the switch ECU 40 via the bus 50. The configuration of the vehicle control system is not limited to such a configuration.

Figure 5:
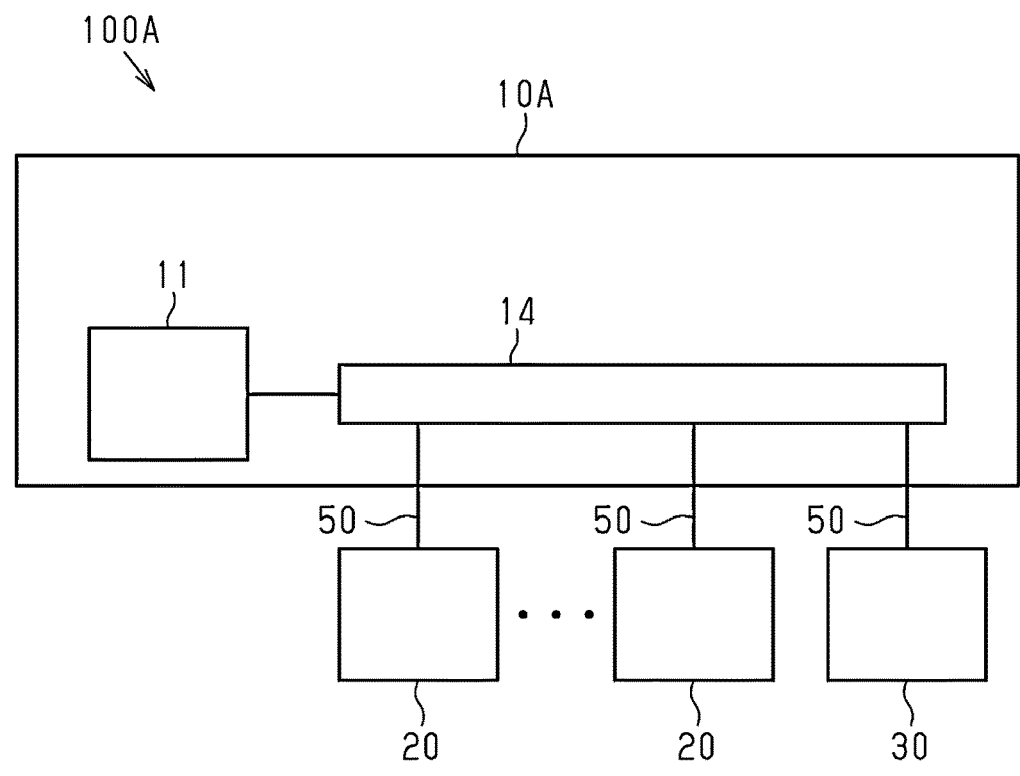
FIG. 5 is a block diagram showing a vehicle control system according to a modification.

FIG. 5 shows a vehicle control system 100A of a modified example. In the vehicle control system 100A, the master ECU 10A may function as the master controller 11 and the switch unit 14. In this case, the master controller 11 is a virtual machine configured on the master ECU 10A, and is a functional unit that functions similarly to the master ECU 10 described above. The switch unit 14 is a virtual machine configured on the master ECU 10A, and is a functional unit that functions similarly to the above-described switch ECU 40.

Figure 6:
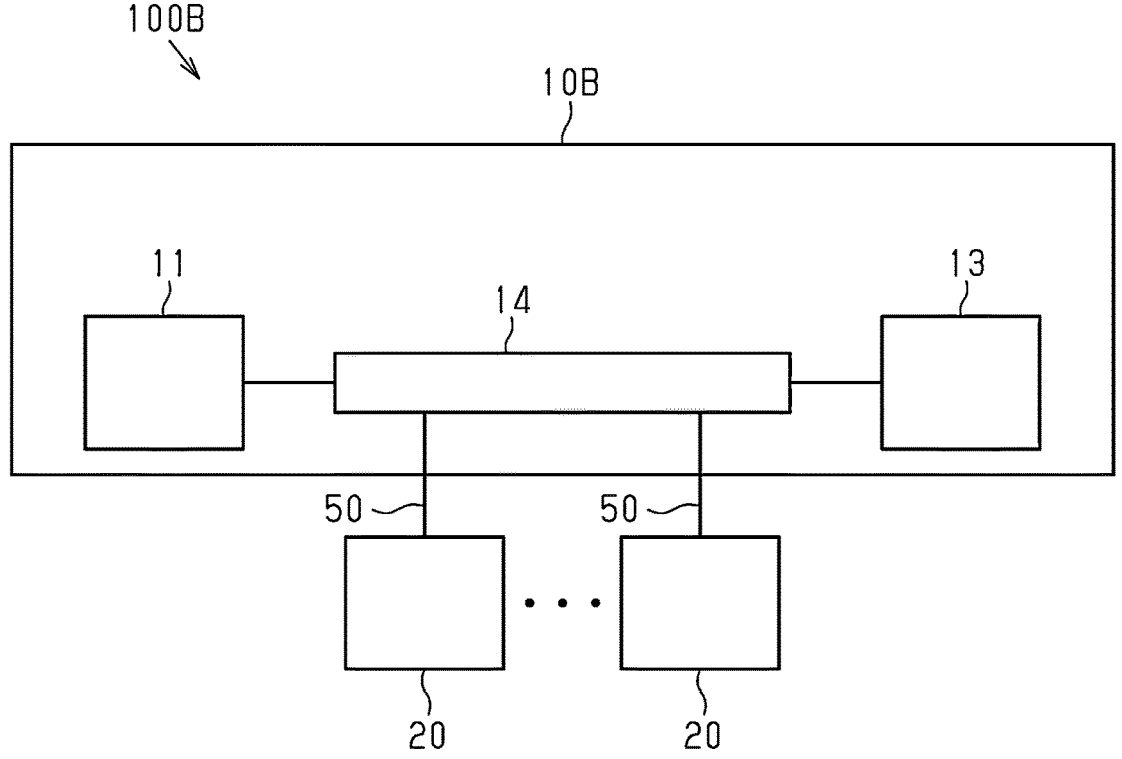
FIG. 6 is a block diagram showing a vehicle control system according to a modification.

FIG. 6 shows a vehicle control system 100B of a modified example. In the vehicle control system 100B, the master ECU 10B may function as the master controller 11, the switch unit 14, and the validator unit 13. In this case, the validator unit 13 is a virtual machine configured on the master ECU 10B, and is a functional unit that functions similarly to the validator ECU 30 described above.

As long as it is possible to determine whether or not an anomaly has occurred in the time synchronization between the master ECU 10 and the slave ECU 20, the determination process may be a process that can be performed by a method different from the method described in the above embodiment.

The validator ECU may not execute the determination process. In this case, the validator ECU transmits the determination necessary information as list information to the master ECU and the multiple slave ECUs. Then, the determination process is executed in each of the master ECU and the multiple slave ECUs.

The ECU is not limited to an ECU that includes a CPU and a ROM and executes software processing. That is, the ECU may have any one of the following configurations (a) to (c).

(a) The ECU includes one or more processors that execute various processes in accordance with a computer program. The processor includes a CPU and memories such as a RAM and a ROM. The memory stores program code or instructions configured to cause the CPU to perform operations. Memory, or computer-readable media, includes any available media that can be accessed by a general purpose or special purpose computer.

(b) The ECU includes one or more dedicated hardware circuits that execute various processes. The dedicated hardware circuit may be, for example, an application specific integrated circuit (ASIC) or a field programmable gate array (FPGA).

(c) The ECU includes a processor that executes some of the various processes in accordance with a computer program, and a dedicated hardware circuit that executes the remaining processes of the various processes.

What is claimed is:

1. A vehicle control system, comprising:
a master controller;
multiple slave controllers configured to communicate with the master controller via an in-vehicle network; and
an information processing device configured to communicate with the master controller and the multiple slave controllers via the in-vehicle network,
wherein the information processing device is configured to
acquire accuracy-related information that is information related to accuracy of time synchronization between the master controller and each of the multiple slave controllers from the master controller and the multiple slave controllers, and
transmit list information based on the accuracy-related information acquired from the master controller and each of the multiple slave controllers to the master controller and to each the multiple slave controllers, wherein the list information includes a diagnostic result of determining whether or not an anomaly has occurred in the time synchronization between the master controller and each of the multiple slave controllers to thereby share the list information with the master controller and each of the multiple slave controllers.

2. The vehicle control system according to claim 1, wherein the information processing device is further configured to
execute a determination process of determining, for each of the multiple slave controllers, whether the anomaly has occurred in the time synchronization between the master controller and the slave controller based on the accuracy-related information, and
transmit, as the list information, a determination result of the determination process for the respective slave controllers to the master controller and each of the multiple slave controllers.

3. The vehicle control system according to claim 1, wherein
the master controller is a master electronic control unit, and the slave controllers are slave electronic control units, and
the information processing device is further configured to
acquire the accuracy-related information from the master electronic control unit and each of the multiple slave electronic control units, and
transmit the list information to the master electronic control unit and to each of the multiple slave electronic control units.

4. An information processing device configured to be communicably connected to a master electronic control unit and multiple slave electronic control units via an in-vehicle network, wherein
the information processing device is configured to
receive accuracy-related information from the master electronic control unit and each of the multiple slave electronic control units, the accuracy-related information being information related to accuracy of time synchronization between the master electronic control unit and each of the multiple slave electronic control units; and
transmit list information based on the accuracy-related information acquired from the master electronic control unit and each of the multiple slave electronic control units to the master electronic control unit and to each of the multiple slave electronic control units, wherein the list information includes a diagnostic result of determining whether or not an anomaly has occurred in the time synchronization between the master electronic control unit and each of the multiple slave electronic control units to thereby share the list information with the master electronic control unit and each of the multiple slave electronic control units.

5. A master electronic control unit configured to be communicably connected to multiple slave electronic control units via an in-vehicle network, wherein
the master electronic control unit is configured to
receive accuracy-related information from each of the multiple slave electronic control units, the accuracy-related information being information related to accuracy of time synchronization between the master electronic control unit and each of the multiple slave electronic control units; and
transmit list information based on the accuracy-related information acquired from each of the multiple slave electronic control units to each of the multiple slave electronic control units, wherein the list information includes a diagnostic result of determining whether or not an anomaly has occurred in the time synchronization between the master electronic control unit and each of the multiple slave electronic control units to thereby share the list information with the master electronic control unit and each of the multiple slave electronic control units.

6. The vehicle control system according to claim 1, wherein the multiple slave controllers are configured to control various devices in a vehicle.

7. The information processing device according to claim 4, wherein the multiple slave electronic control units are configured to control various devices in a vehicle.

8. The master electronic control unit according to claim 5, wherein the multiple slave electronic control units are configured to control various devices in a vehicle.

\* \* \* \* \*